(12) United States Patent
Takeuchi et al.

(10) Patent No.: US 9,337,475 B2
(45) Date of Patent: May 10, 2016

(54) POWER STORAGE DEVICE

(75) Inventors: Toshihiko Takeuchi, Kanagawa (JP); Minoru Takahashi, Nagano (JP); Takeshi Osada, Kanagawa (JP); Teppei Oguni, Kanagawa (JP); Kazuki Tanemura, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 85 days.

(21) Appl. No.: 13/586,050

(22) Filed: Aug. 15, 2012

(65) Prior Publication Data
US 2013/0052527 A1 Feb. 28, 2013

(30) Foreign Application Priority Data

Aug. 30, 2011 (JP) .................................. 2011-186811

(51) Int. Cl.
| | |
|---|---|
| H01M 4/134 | (2010.01) |
| H01G 11/06 | (2013.01) |
| H01G 11/30 | (2013.01) |
| H01G 11/50 | (2013.01) |
| H01M 10/0525 | (2010.01) |

(52) U.S. Cl.
CPC ............... *H01M 4/134* (2013.01); *H01G 11/06* (2013.01); *H01G 11/30* (2013.01); *H01G 11/50* (2013.01); *H01M 10/0525* (2013.01); *H01M 2220/20* (2013.01); *Y02E 60/122* (2013.01); *Y02E 60/13* (2013.01); *Y02T 10/7011* (2013.01); *Y02T 10/7022* (2013.01); *Y10T 428/23943* (2015.04)

(58) Field of Classification Search
CPC .......................... H01M 4/134; H01M 10/0525

USPC ......................................................... 429/211
See application file for complete search history.

(56) References Cited

U.S. PATENT DOCUMENTS

| | | |
|---|---|---|
| 3,796,598 A | 3/1974 | Gejyo et al. |
| 4,155,781 A | 5/1979 | Diepers |

(Continued)

FOREIGN PATENT DOCUMENTS

| | | |
|---|---|---|
| CN | 101567438 A | 10/2009 |
| EP | 2104175 A | 9/2009 |

(Continued)

OTHER PUBLICATIONS

Cui et al. "Crystalline-Amorphous Core—Shell Silicon Nanowires for High Capacity and High Current Battery Electrodes", Nano Letters 2009 9 (1), 491-495.*

(Continued)

*Primary Examiner* — Nicholas P D'Aniello
(74) *Attorney, Agent, or Firm* — Nixon Peabody LLP; Jeffrey L. Costellia

(57) ABSTRACT

A power storage device in which silicon is used as a negative electrode active material layer and which can have an improved performance such as higher discharge capacity, and a method for manufacturing the power storage device are provided. A power storage device includes a current collector and a silicon layer having a function as an active material layer over the current collector. The silicon layer includes a thin film portion in contact with the current collector, a plurality of bases, and a plurality of whisker-like protrusions extending from the plurality of bases. A protrusion extending from one of the plurality of bases is partly combined with a protrusion extending from another one of the plurality of bases.

18 Claims, 8 Drawing Sheets

(56) References Cited

U.S. PATENT DOCUMENTS

| | | |
|---|---|---|
| 4,764,853 A | 8/1988 | Thomas et al. |
| 5,338,625 A | 8/1994 | Bates et al. |
| 5,534,716 A | 7/1996 | Takemura |
| 5,643,826 A | 7/1997 | Ohtani et al. |
| 5,705,829 A | 1/1998 | Miyanaga et al. |
| 5,824,434 A | 10/1998 | Kawakami et al. |
| 6,134,902 A | 10/2000 | Curry |
| 6,165,824 A | 12/2000 | Takano et al. |
| 6,307,214 B1 | 10/2001 | Ohtani et al. |
| 6,451,113 B1 | 9/2002 | Givargizov |
| 6,514,395 B2 | 2/2003 | Zhou et al. |
| 6,624,445 B2 | 9/2003 | Miyanaga et al. |
| 6,645,667 B1 | 11/2003 | Iwamoto et al. |
| 6,685,804 B1 | 2/2004 | Ikeda et al. |
| 6,815,003 B2 | 11/2004 | Yagi et al. |
| 6,844,113 B2 | 1/2005 | Yagi et al. |
| 6,887,511 B1 | 5/2005 | Shima et al. |
| 6,955,954 B2 | 10/2005 | Miyanaga et al. |
| 7,015,496 B2 | 3/2006 | Ohnuma et al. |
| 7,192,673 B1 | 3/2007 | Ikeda et al. |
| 7,195,842 B1 | 3/2007 | Fujimoto et al. |
| 7,235,330 B1 | 6/2007 | Fujimoto et al. |
| 7,241,533 B1 | 7/2007 | Ikeda et al. |
| 7,368,306 B2 | 5/2008 | Ohnuma et al. |
| 7,396,409 B2 | 7/2008 | Hatta et al. |
| 7,402,829 B2 | 7/2008 | Green |
| 7,410,728 B1 | 8/2008 | Fujimoto et al. |
| 7,655,354 B2 | 2/2010 | Kawase et al. |
| 7,658,871 B2 | 2/2010 | Matsubara et al. |
| 7,683,359 B2 | 3/2010 | Green |
| 7,794,878 B2 | 9/2010 | Kogetsu et al. |
| 7,794,881 B1 | 9/2010 | Fujimoto et al. |
| 7,842,535 B2 | 11/2010 | Green |
| 7,846,583 B2 | 12/2010 | Oh et al. |
| 7,923,148 B2 | 4/2011 | Yamamoto et al. |
| 8,017,430 B2 | 9/2011 | Green |
| 8,105,718 B2 | 1/2012 | Nakanishi et al. |
| 2002/0102348 A1 | 8/2002 | Yagi et al. |
| 2002/0168574 A1 | 11/2002 | Ahn et al. |
| 2005/0042128 A1 | 2/2005 | Matsubara et al. |
| 2005/0244324 A1 | 11/2005 | Hatta et al. |
| 2007/0007239 A1 | 1/2007 | Lee et al. |
| 2007/0131915 A1 | 6/2007 | Stankovich et al. |
| 2007/0166613 A1 | 7/2007 | Kogetsu et al. |
| 2007/0232028 A1 | 10/2007 | Lee et al. |
| 2007/0292339 A1 | 12/2007 | Kubomura et al. |
| 2007/0295718 A1 | 12/2007 | Takei et al. |
| 2008/0020281 A1 | 1/2008 | Kogetsu et al. |
| 2008/0220337 A1 | 9/2008 | Kawase et al. |
| 2008/0233478 A1 | 9/2008 | Hirose et al. |
| 2008/0297981 A1 | 12/2008 | Endo et al. |
| 2009/0045680 A1 | 2/2009 | Litch et al. |
| 2009/0050204 A1 | 2/2009 | Habib |
| 2009/0104515 A1 | 4/2009 | Fujikawa et al. |
| 2009/0110627 A1 | 4/2009 | Choi et al. |
| 2009/0117462 A1 | 5/2009 | Okazaki et al. |
| 2009/0123850 A1 | 5/2009 | Takeuchi et al. |
| 2009/0136847 A1 | 5/2009 | Jeong et al. |
| 2009/0169996 A1 | 7/2009 | Zhamu et al. |
| 2009/0214944 A1 | 8/2009 | Rojeski |
| 2009/0253045 A1 | 10/2009 | Kotato et al. |
| 2009/0317726 A1 | 12/2009 | Hirose et al. |
| 2009/0325365 A1 | 12/2009 | Park et al. |
| 2010/0081057 A1 | 4/2010 | Liu et al. |
| 2010/0086837 A1 | 4/2010 | Asari et al. |
| 2010/0119948 A1 | 5/2010 | Hasegawa et al. |
| 2010/0151322 A1 | 6/2010 | Sato et al. |
| 2010/0151329 A1 | 6/2010 | Sato et al. |
| 2010/0178564 A1 | 7/2010 | Asari et al. |
| 2010/0209784 A1 | 8/2010 | Yamazaki et al. |
| 2010/0233538 A1 | 9/2010 | Nesper et al. |
| 2010/0233546 A1 | 9/2010 | Nesper et al. |
| 2010/0266898 A1 | 10/2010 | Yamamoto et al. |
| 2010/0285358 A1* | 11/2010 | Cui et al. ............ 429/218.1 |
| 2010/0308277 A1 | 12/2010 | Grupp et al. |
| 2010/0319188 A1 | 12/2010 | Yamazaki et al. |
| 2011/0027655 A1 | 2/2011 | Rojeski |
| 2011/0117436 A1 | 5/2011 | Ma et al. |
| 2011/0121240 A1 | 5/2011 | Amine et al. |
| 2011/0151290 A1 | 6/2011 | Cui et al. |
| 2011/0206993 A1 | 8/2011 | Tsukada et al. |
| 2011/0212363 A1 | 9/2011 | Yamazaki et al. |
| 2011/0236757 A1 | 9/2011 | Yukawa et al. |
| 2011/0266654 A1 | 11/2011 | Kuriki et al. |
| 2011/0269016 A1 | 11/2011 | Takeuchi et al. |
| 2011/0289767 A1 | 12/2011 | Yamazaki |
| 2011/0291240 A1 | 12/2011 | Yamazaki |
| 2011/0292564 A1 | 12/2011 | Yamazaki |
| 2011/0294005 A1 | 12/2011 | Kuriki et al. |
| 2011/0294011 A1 | 12/2011 | Kuriki et al. |
| 2011/0300445 A1 | 12/2011 | Murakami et al. |
| 2011/0305950 A1 | 12/2011 | Kuriki et al. |
| 2012/0003383 A1 | 1/2012 | Furuno |
| 2012/0003530 A1 | 1/2012 | Kuriki et al. |
| 2012/0003807 A1 | 1/2012 | Furuno et al. |
| 2012/0015247 A1 | 1/2012 | Yoshida |
| 2012/0045692 A1 | 2/2012 | Takemura et al. |
| 2012/0070738 A1 | 3/2012 | Yoshida |
| 2012/0088151 A1 | 4/2012 | Yamazaki et al. |
| 2012/0088156 A1 | 4/2012 | Nomoto et al. |
| 2012/0135302 A1 | 5/2012 | Yokoi et al. |
| 2012/0328962 A1 | 12/2012 | Takeuchi et al. |
| 2013/0164612 A1* | 6/2013 | Tanemura et al. ............ 429/211 |

FOREIGN PATENT DOCUMENTS

| | | |
|---|---|---|
| JP | 06-060870 | 3/1994 |
| JP | 2001-210315 | 8/2001 |
| JP | 2002-164556 A | 6/2002 |
| JP | 2002-237294 | 8/2002 |
| JP | 2003-246700 | 9/2003 |
| JP | 2003-258285 A | 9/2003 |
| JP | 2004-281317 | 10/2004 |
| JP | 2005-108521 | 4/2005 |
| JP | 2005-196970 | 7/2005 |
| JP | 2005-209533 | 8/2005 |
| JP | 2006-080450 A | 3/2006 |
| JP | 2007-012421 | 1/2007 |
| JP | 2007-299580 | 11/2007 |
| JP | 2007-308774 | 11/2007 |
| JP | 2008-103118 | 5/2008 |
| JP | 2008-146840 | 6/2008 |
| JP | 2008-010316 A | 1/2009 |
| JP | 2009-043523 | 2/2009 |
| JP | 2009-087891 | 4/2009 |
| JP | 2009-134917 | 6/2009 |
| JP | 2009-289586 | 12/2009 |
| JP | 2010-033968 | 2/2010 |
| JP | 2010-262752 A | 11/2010 |
| JP | 2011-048992 | 3/2011 |

OTHER PUBLICATIONS

Chan.C et al., "High-performance lithium battery anodes using silicon nanowires," Nature Nanotechnology, vol. 3, pp. 31-35, Jan. 2008.

Kamins et al., "Ti-catalyzed Si nonowires by chemical vapor deposition: Microscopy and growth mechanisms", *Journal of Applied Physics*, vol. 89, No. 2, pp. 1008-1016, Jan. 15, 2001.

Miyamoto et al., "Polytypism and Amorphousness in Silicon Whiskers", Journal of the Physical Society of Japan, vol. 44, No. 1, pp. 181-190, Jan. 1, 1978.

Cui et al., "Crystalline-Amorphous Core-ShellSilicon Nanowires for High Capacity andHigh Current Battery Electrodes", Nano Letters, vol. 9, No. 1, pp. 491-495, 2009.

Kohno et al., "Silicon Nanoneedles Grown by a Simple Thermal Treatment Using Metal-Sulfur Catalysts", Japanese Journal of Applied Physics, vol. 41, Part 1, No. 2A, pp. 577-578, 2002.

Kohno et al., "Chains of crystalline-Si nanospheres: growth and properties," e-Journal of Surface Science and Nanotechnology, vol. 3 pp. 131-140, Apr. 15, 2005.

Kohno et al., "Plasmon-loss imaging of chains of crystalline-silicon nanospheres and silicon nanowires," Journal of Electron Microscopy, vol. 49(2) pp. 275-280, 2000.

(56) References Cited

OTHER PUBLICATIONS

Kohno et al., "Periodic instability in growth of chains of crystalline-silicon nanospheres," Journal of Crystal Growth, vol. 216 pp. 185-191, 2000.
Kohno et al., "Metal-mediated growth of alternate semiconductor-insulator nanostructures," Solid State Communications, vol. 116, pp. 591-594, 2000.
Kohno et al., "Le'vy-type complez diameter modulation in semiconductor nanowire growth," Solid State Communications, vol. 132, pp. 59-62, 2004.
Mori et al., "Core-shell SiGe whiskers with composition gradient along the axial direction: Cross-sectional analysis," Applied Physics Letters, vol. 87, pp. 083111/1-3, 2005.
Kohno et al., "Self-organized chain of crystalline-silicon nanospheres," Applied Physics Letters, vol. 73, No. 21, pp. 3144-3146, Nov. 23, 1998.
Kohno et al., "Infusing metal into self-organized semiconductor nanostructures," Applied Physics Letters, vol. 83, No. 6, pp. 1202-1203, Aug. 11, 2003.
Kohno et al., "Multiscaling in semiconductor nanowire growth," Physical Review E, vol. 70, pp. 062601/1-3, 2004.
Wagner et al., "Vapor-Liquid-Solid Mechanism of Single Crystal Growth" (Applied Physics Letters) vol. 4, No. 5, pp. 89-90, Mar. 1, 1964.
Gangloff.L et al., "Self-Aligned, Gated Arrays of Individual Nanotube and Nanowire Emitters", Nano Letters, Sep. 1, 2004, vol. 4, No. 9, pp. 1575-1579.
Felter.T et al., "Cathodoluminescent Field Emission Flat Panel Display Prototype Built Using Arrays of Diamond-Coated Silicon Tips", SID Digest '98 : SID International Symposium Digest of Technical Papers, May 1, 1998, vol. 29, pp. 577-581.
Leu.I et al., "Chemical Vapor Deposition of Silicon Carbide Whiskers Activated by Elemental Nickel", J. Electrochem. Soc. (Journal of the Electrochemical Society), 1999, vol. 146, No. 1, pp. 184-188.
Pedraza.A et al., "Silicon microcolumn arrays grown by nanosecond pulsed-excimer laser irradiation", Appl. Phys. Lett. (Applied Physics Letters), Apr. 19, 1999, vol. 74, No. 16, pp. 2322-2324.
Jung.H et al., "Amorphous silicon thin-film negative electrode prepared by low pressure chemical vapor deposition for lithium-ion batteries", Solid State Communications, Feb. 1, 2003, vol. 125, No. 7-8, pp. 387-390.
Albuschies.J et al., "High-Density Silicon Nanowire Growth From Self-Assembled Au Nanoparticles", Microelectronic Engineering, Feb. 20, 2006, vol. 83, pp. 1530-1533, Elsevier.
Chinese Office Action (Application No. 201210312716.6) Dated Oct. 23, 2015.

* cited by examiner

POWER STORAGE DEVICE

BACKGROUND OF THE INVENTION

1. Field of the Invention

The present invention relates to a power storage device and a method for manufacturing the power storage device.

Note that the power storage device indicates all elements and devices which have a function of storing power.

2. Description of the Related Art

In recent years, in order to save energy resources and solve environmental problems, power storage devices such as lithium-ion secondary batteries, lithium-ion capacitors, and air cells have been actively developed.

An electrode for the power storage device is manufactured by providing an active material over a surface of a current collector. As the active material, a material which can occlude and release ions functioning as carriers, such as carbon or silicon, is used. For example, silicon or phosphorus-doped silicon has a higher theoretical capacity than carbon and thus is advantageous in increasing capacity of a power storage device (e.g., Patent Document 1).

REFERENCE

Patent Document

[Patent Document 1] Japanese Published Patent Application No. 2001-210315

SUMMARY OF THE INVENTION

However, even when silicon is used as a negative electrode active material, it is difficult to obtain as high a discharge capacity as the theoretical capacity. Thus, an object is to provide a power storage device which can have an improved performance such as higher discharge capacity, and a method for manufacturing the power storage device.

In view of the above, the present inventers manufactured a power storage device in which a silicon layer including a whisker-like protrusion is provided as a negative electrode active material over a current collector. Using the silicon layer including a whisker-like protrusion as part of the negative electrode active material causes an increase in a surface area of an active material layer. In accordance with an increase in the surface area, in the power storage device, the rate at which a reaction substance such as lithium ions is occluded by the silicon layer or the rate at which the reaction substance is released from the silicon layer per unit mass becomes high. When the rate at which the reaction substance is occluded or released becomes high, the amount of occlusion or release of the reaction substance at a high current density is increased; therefore, the discharge capacity or the charge capacity of the power storage device is increased. That is, with the use of the silicon layer including a whisker-like protrusion as the active material layer, the performance of the power storage device can be improved.

An embodiment of the present invention is a power storage device including a current collector and a silicon layer functioning as an active material layer formed over the current collector. The silicon layer includes a portion having a thin film shape (hereinafter referred to as a thin film portion) and a plurality of whisker-like (string-like or fiber-like) portions (hereinafter simply referred to as whiskers). Bottoms of the plurality of whiskers are integrated to form a base having a stump-like shape (hereinafter simply referred to as a base). When a plurality of whiskers are being formed, bottoms of some of the plurality of whiskers formed over the current collector are gathered into a base having a stump-like shape and then these whiskers extend. A plurality of bases exist in a scattered manner in the thin film portion in a top view, and the bases are formed over the current collector in a cross-sectional view In other words, the base is a batch of a plurality of whiskers and can also be referred to as a group of whiskers. The base that is a group of bottoms of the plurality of whiskers is formed in and over the thin film portion. The plurality of whiskers protrude from the base in a branched manner. Note that not all the whiskers of the silicon layer belong to any base to grow; some of the whiskers grow over the current collector independently.

For the current collector, a material with high conductivity, such as a metal element typified by titanium, platinum, aluminum, or copper, can be used. In addition, the current collector can be formed using a metal element which forms silicide by reacting with silicon.

The whisker is a protrusion including a bending portion or a branching portion and extends in a predetermined direction or any direction from the bottom. In the present invention, "to extend" means that the whisker grows and gets long. The shape of the whisker is, for example, a columnar shape such as a cylindrical shape or a prismatic shape, or a needle-like shape such as a conical shape or a pyramidal shape.

The silicon layer is formed by a low-pressure chemical vapor deposition method (hereinafter also referred to as an LPCVD method) using a deposition gas containing silicon as a source gas. An LPCVD method is performed at a temperature of higher than 500° C. with a source gas, a deposition gas containing silicon, supplied into a reaction space. With this, the thin film portion of the silicon layer is formed over the current collector and the whisker grows.

In the case where groups of whiskers which have stump-like shapes are formed close to each other in order to increase the discharge capacity, since the volume of the base increases in accordance with occlusion of ions which serve as carriers, the bases come in contact with each other; in such a case, the silicon layer might be separated from the current collector. In addition, the whisker has a thin and long string-like or fiber-like shape and thus generally has low mechanical strength and is vulnerable to physical impact. Thus, particularly in the case of manufacturing a wound electrode body with the use of a winder, the silicon layer including a whisker might be broken.

In view of the above, an embodiment of the present invention is a power storage device in which a whisker extending from one base is partly combined with a whisker extending from another base so that a plurality of different bases are bridged with the combined whiskers. In addition, an embodiment of the present invention is a power storage device in which a whisker extending from one base is partly combined with and crosses a whisker extending from another base so that a plurality of different bases are bridged with the combined whiskers.

It is preferable that in the whisker, the core which serves as an axis be formed using crystalline silicon and the outer shell which surrounds the core be formed using amorphous silicon. The whisker extends by the crystal growth of the core, and amorphous silicon is formed around and so as to cover the core.

When a whisker extending from one base and a whisker extending from another base come in contact with each other, the whiskers are combined with each other in the contact point. After that, each whisker further extends in the direction in which it has extended so far in some cases. In that case, the whisker which further extends may also be combined with another whisker. When a bridge structure is formed by combination of a plurality of whiskers from different bases in such a manner, the mechanical strength of the whiskers as a whole can be improved.

Even when silicon is used as a negative electrode active material, it has been difficult to obtain as high a discharge capacity as the theoretical capacity in a conventional case. In the present invention, a whisker-like protrusion is provided as part of the negative electrode active material, whereby the surface area of the active material layer is increased. With this, in the power storage device, the rate at which a reaction substance is occluded or released by/from the silicon layer is increased, and the discharge capacity or the charge capacity of the power storage device is increased. That is, with the use of the silicon layer including a whisker-like protrusion as the active material layer, the performance of the power storage device can be improved.

In addition, a plurality of whiskers are generated together in a stump-like shape and a group of whiskers is formed, whereby, as compared to the case where a whisker is formed independently over a current collector, adhesion of the silicon layer to the current collector which is an underlying material can be improved and the physical strength can be improved.

In addition, when a bridge structure is formed by combination of a plurality of whiskers formed from different bases, the strength of the whisker itself can be improved. That is, whereas whiskers without a bridge structure are vulnerable to physical impact or the like which might be caused in the manufacturing process of a power storage device, such as a cell assembly, the mechanical strength of the whisker with the bridge structure can be high.

In addition, when the deposition time of the active material layer is lengthened, the diameter of the whisker can be increased. Accordingly, the bridge structure can be formed using whiskers having predetermined diameters, which can further increase the physical strength.

In addition, when bases of whiskers are formed close to each other and the volumes of the bases increase, the active material layer (silicon layer) might be separated; however, this can be suppressed by combination of the whiskers. Accordingly, the deterioration of the power storage device can be reduced.

In addition, by forming a complex bridge structure through combination of a plurality of whiskers extending from different bases, the surface area of the active material layer can be increased and a plurality of bases can exist sparsely.

DETAILED DESCRIPTION OF THE INVENTION

Embodiments will be described below. Note that the present invention can be implemented in many different modes. It will be readily appreciated by those skilled in the art that modes and details thereof can be modified in various ways without departing from the spirit and the scope of the present invention. Thus, the present invention should not be interpreted as being limited to the description of the embodiments below.

Embodiment 1

In this embodiment, an electrode of a power storage device which is an embodiment of the present invention and a manufacturing method thereof will be described.

The electrode of the power storage device and the manufacturing method thereof will be described with reference to FIGS. 1A to 1C.

Figure 1A:
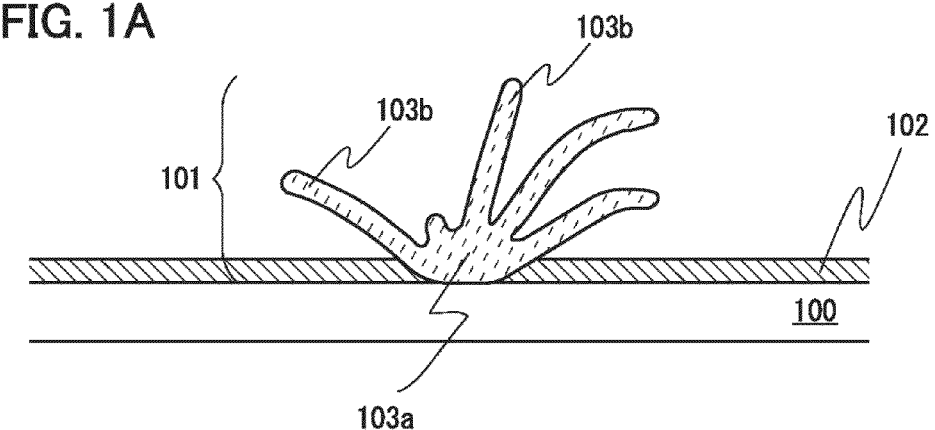
FIGS. 1A to 1C are diagrams each illustrating the structure of an active material layer according to an embodiment of the present invention.

As illustrated in FIG. 1A, a silicon layer is formed as an active material layer 101 over a current collector 100 by a thermal CVD method, preferably, an LPCVD method. Thus, an electrode including the current collector 100 and the active material layer 101 is formed.

The current collector 100 serves as a current collector of the electrode. Thus, a conductive material having a foil shape, a plate shape, or a net shape is used. The current collector 100 can be formed using, but not particularly limited to, a metal element with high conductivity typified by titanium, platinum, aluminum, copper, or the like. Note that in the case of using aluminum for the current collector, an aluminum alloy to which an element that improves heat resistance such as silicon, titanium, neodymium, scandium, or molybdenum is added is preferably used. Alternatively, the current collector 100 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like.

The silicon layer is formed as the active material layer 101 by an LPCVD method. Here, the temperature for forming an active material including a plurality of whiskers is preferably higher than 400° C. and lower than or equal to the temperature which an LPCVD apparatus and the current collector 100 can withstand, more preferably higher than or equal to 500° C. and lower than 580° C. A deposition gas containing silicon is used as a source gas. Examples of the deposition gas containing silicon include silicon hydride, silicon fluoride, and silicon chloride; typically, $SiH_4$, $Si_2H_6$, $SiF_4$, $SiCl_4$, $Si_2Cl_6$, and the like are given. Note that one or more of a rare gas such as helium, neon, argon, or xenon and hydrogen may be mixed into the source gas.

In addition, in formation of the plurality of whiskers, the pressure is set to higher than or equal to 10 Pa and lower than or equal to 1000 Pa, preferably higher than or equal to 20 Pa and lower than or equal to 200 Pa.

When the flow rate of the deposition gas containing silicon is high, the deposition rate (depo rate) becomes high, so that the silicon layer is likely to have an amorphous structure. When the flow rate of the deposition gas containing silicon is low, the deposition rate becomes low, so that the silicon layer is likely to have a crystalline structure. Thus, the flow rate of the deposition gas containing silicon may be appropriately determined in consideration of the deposition rate and the like. For example, the flow rate of the deposition gas containing silicon may be greater than or equal to 300 sccm and less than or equal to 1000 sccm.

Note that oxygen is contained as an impurity in the active material layer 101 in some cases. This is because oxygen is desorbed from a quartz chamber of an LPCVD apparatus by heating performed in formation of the silicon layer as the active material layer 101 by an LPCVD method, and the oxygen diffuses into the silicon layer.

Note that an impurity element imparting one conductivity type, such as phosphorus or boron, may be added to the silicon layer. The silicon layer to which the impurity element imparting one conductivity type, such as phosphorus or boron, is added has higher conductivity, so that the conductivity of the electrode can be increased. Thus, the discharge capacity or the charge capacity can be further increased.

When the silicon layer is formed as the active material layer 101 by an LPCVD method, a low-density region is not formed between the current collector 100 and the active material layer 101, so that electrons transfer easily at the interface between the current collector 100 and the silicon layer, and the adhesion between the current collector 100 and the silicon layer can be increased. This is because active species of the source gas are kept supplied to the silicon layer that is being deposited in a step of forming the silicon layer, and silicon diffuses into the current collector 100 from the silicon layer. Even if a region (a sparse region) lacking in silicon is formed, with the active species of the source gas which are kept supplied to the region, a low-density region is difficult to form in the silicon layer. In addition, since the silicon layer is formed over the current collector 100 by vapor deposition, throughput can be improved.

It is particularly preferable that a thin film portion 102 be not crystalline but amorphous. This is because the thin film portion 102 having an amorphous structure is more likely to be formed so as to be compatible with the surface of the current collector 100. Moreover, in the case where this embodiment is applied to the power storage device, the thin film portion 102 having an amorphous structure is resistant to change in volume due to occlusion and release of ions (e.g., stress caused by change in volume is relieved), so that pulverization and separation of the active material layer 101 (in particular, the whisker) due to repeating charge/discharge can be prevented, and a power storage device having much higher cycle characteristics can be manufactured.

On the other hand, in the case where the thin film portion 102 is crystalline, the thin film portion 102 is excellent in conductivity and ion mobility, so that the conductivity of the entire active material layer 101 can be further improved. That is, in the case where this embodiment is applied to the power storage device, high speed charge/discharge can be performed, so that a power storage device with much higher charge/discharge capacity can be manufactured.

Figure 1B:
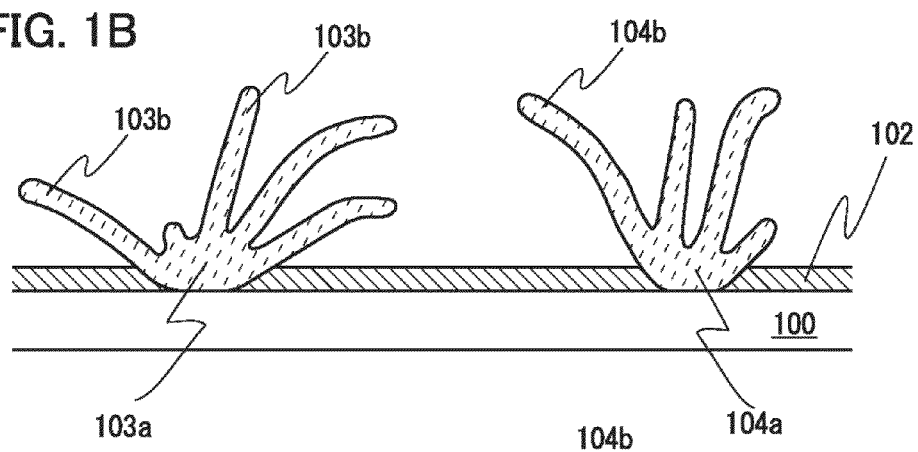
Figure 1C:
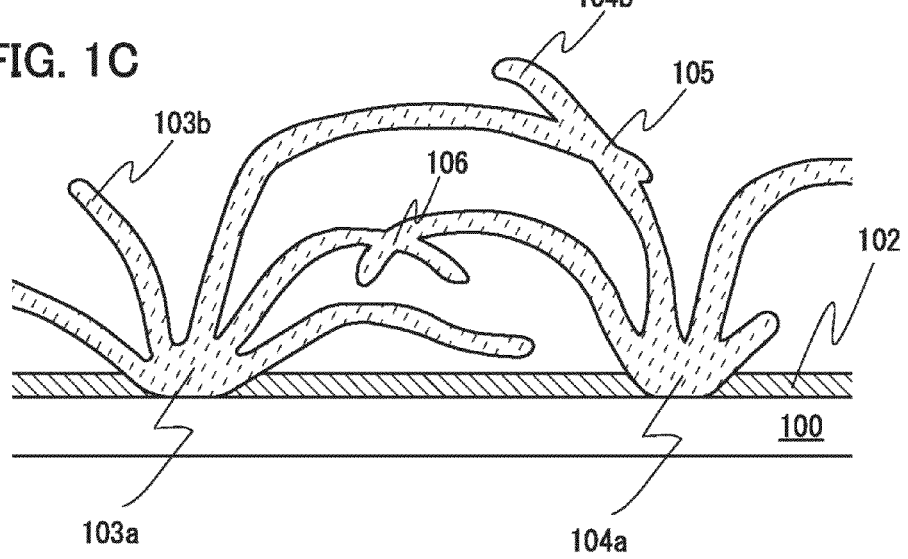

FIGS. 1A to 1C each illustrate an example of a specific structure of the active material layer 101.

FIG. 1A illustrates a base in the case where a whisker in the active material layer is growing. The active material layer 101 includes a portion having a thin film shape (a thin film portion) 102, a base 103a formed in or over the thin film portion, and a whisker-like portion (a whisker) 103b. The thin film portion 102 can be formed using amorphous silicon. In that case, even when the volume of the base increases, distortion due to the increase in volume can be absorbed by the thin film portion. Alternatively, when the thin film portion 102 is formed using crystalline silicon, the active material can have high conductivity. The thin film portion 102 is provided so as to cover the current collector 100.

The plurality of whiskers 103b are provided as whisker-like (string-like or fiber-like) protrusions. Bottoms of the plurality of whiskers are integrated to form the base 103a. In other words, the plurality of whiskers 103b each extend in any direction from the base 103a. The base unifies the plurality of whiskers and is a group of whiskers. The plurality of bases 103a exist in a scattered manner in the thin film portion 102 in a top view, and the base 103a is formed over the current collector 100 in a cross-sectional view.

FIG. 1B illustrates two bases (103a and 104a) formed over the current collector 100 and whiskers. At the time when the bases are generated, whiskers 103b and 104b grown from the bases 103a and 104a are not combined with each other. The two bases (103a and 104a) are provided with a predetermined distance therebetween. There is no particular limitation on the distance between the two bases; for example, the distance may be greater than or equal to 1 μm and less than or equal to 10 μm, preferably greater than or equal to 1 μm and less than or equal to 5 μm. When the distance between the two bases is too long, the possibility of combination of the whiskers grown from the two bases is low and the whiskers are combined with difficulty. Even when the whiskers are combined with each other, sufficient mechanical strength cannot be maintained. On the other hand, when the distance between the two bases is too short, since the volume of the base increases due to occlusion of ions which serve as carriers, the bases are in contact with each other, resulting in separation of the film.

From the state of FIG. 1B, a certain time further passes; FIG. 1C illustrates the state of the whiskers at that time. The whiskers 103b and 104b have extended in their respective directions with passage of time. The whisker 103b and the whisker 104b which have extended are in contact with each other to form a linking portion 105 and a linking portion 106 in some cases. The possibility of contact of whiskers grown from different bases is increased as the distance between the bases becomes shorter or the number of whiskers extending from one base becomes larger. By the combination of the whiskers, the bases are linked with each other; as a result, a bridge structure for the bases is completed.

When one whisker is combined with another whisker, one of the whiskers stops extending in some cases. Alternatively, both the whiskers continue to extend in their respective growth directions while crossing each other.

Figure 2:
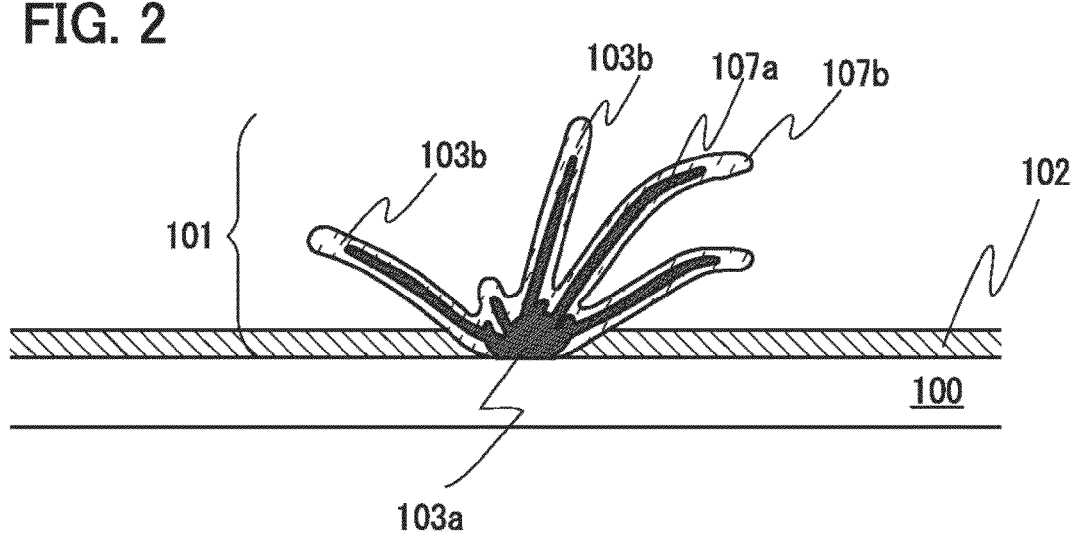
FIG. 2 is a diagram illustrating the inner structure of a whisker.

As illustrated in FIG. 2, in the active material layer 101, a plurality of whiskers 103b each preferably include a core 107a which has a crystalline structure and an outer shell 107b which has an amorphous structure. The amorphous structure of the outer shell has a characteristic that the volume is less likely to be changed due to occlusion and release of ions (e.g., stress caused by an increase in volume is relieved). In addition, the crystalline structure of the core, which has excellent conductivity and ion mobility, has a characteristic that the rate at which ions are occluded and the rate at which ions are released per unit mass are high. Thus, when the active material including a plurality of whiskers each having the core and the outer shell is used for the electrode, charge/discharge can be performed at high speed; accordingly, a power storage device whose charge/discharge capacity and cycle characteristics are improved can be manufactured.

The plurality of whiskers are not limited to have the above structure, and each of the whiskers 103b may be entirely crystalline or amorphous.

The plurality of whiskers 103b may each have a columnar shape (a cylindrical shape or a prismatic shape) or a conical shape or a pyramidal shape (which may also be referred to as a needle-like shape). In addition, the top of each of the plurality of whiskers may be rounded.

In addition, the longitudinal directions of the plurality of whiskers are not necessarily the same. In a transverse cross section of the whisker (the plane perpendicular to the longitudinal direction of the whisker), the core 107a is observed or not observed depending on the position. Further, the transverse cross section of the whisker-like active material is circular when the whisker has a cylindrical or conical shape, and is polygonal when the whisker has a prismatic or pyramidal shape. It is preferable that the longitudinal directions of the whiskers be not the same because one whisker may be in contact with another whisker in a complicated manner, so that detachment (or separation) of the whisker-like active material does not easily occur in charge/discharge.

Note that the direction in which the whisker extends from the thin film portion 102 is referred to as a longitudinal direction, and the plane perpendicular to the longitudinal direction of the whisker is referred to as a transverse cross section.

The width of the core 107a in the transverse cross section is greater than or equal to 0.2 µm and less than or equal to 3 preferably greater than or equal to 0.5 and less than or equal to 2 µm.

The length of the core 107a is not particularly limited but may be greater than or equal to 0.5 µm and less than or equal to 1000 µm, preferably greater than or equal to 2.5 µm and less than or equal to 100 µm.

In addition, the width of the base 103a in the transverse cross section is, for example, about 500 nm although it depends on the number of whiskers included in the base, since the base includes a plurality of whiskers.

The electrode of the power storage device described in this embodiment includes, in a silicon layer functioning as an active material layer, at least a plurality of bases each including a plurality of bottoms of whiskers. In addition, whiskers generated from different bases are combined with each other to form a bridge structure. Thus, the mechanical strength of the silicon layer including the whiskers can be increased; therefore, the discharge capacity or the charge capacity can be increased and deterioration of the power storage device can be suppressed.

Note that FIGS. 1A to 1C illustrate an embodiment in which the current collector 100 is formed using a conductive material having a foil shape, a plate shape, or a net shape; however, the current collector 100 can be formed in a film shape over a substrate by using a sputtering method, an evaporation method, a printing method, an inkjet method, a CVD method, or the like as appropriate.

According to this embodiment, a power storage device having an improved performance such as higher discharge capacity or charge capacity can be provided. In addition, a power storage device in which deterioration due to separation of an active material layer or the like can be reduced can be provided.

Embodiment 2

In this embodiment, a power storage device according to an embodiment of the present invention will be described.

The power storage device according to an embodiment of the present invention includes at least a positive electrode, a negative electrode, a separator, and an electrolyte. The electrode described in Embodiment 1 is used as the negative electrode.

The electrolyte is a nonaqueous solution containing a salt or a solution containing a salt. Any salt can be used as the salt as long as it contains carrier ions such as alkali metal ions, alkaline earth metal ions, beryllium ions, or magnesium ions. Examples of the alkali metal ions include lithium ions, sodium ions, and potassium ions. Examples of the alkaline earth metal ions include calcium ions, strontium ions, and barium ions. In this embodiment, a salt containing lithium ions (hereinafter referred to as a lithium-containing salt) is used as the salt.

With the above structure, a lithium-ion secondary battery or a lithium-ion capacitor can be formed. In addition, an electric double layer capacitor can be formed by using only a solvent for the electrolyte without using a salt.

Here, a lithium-ion secondary battery will be described with reference to the drawings.

Figure 3A:
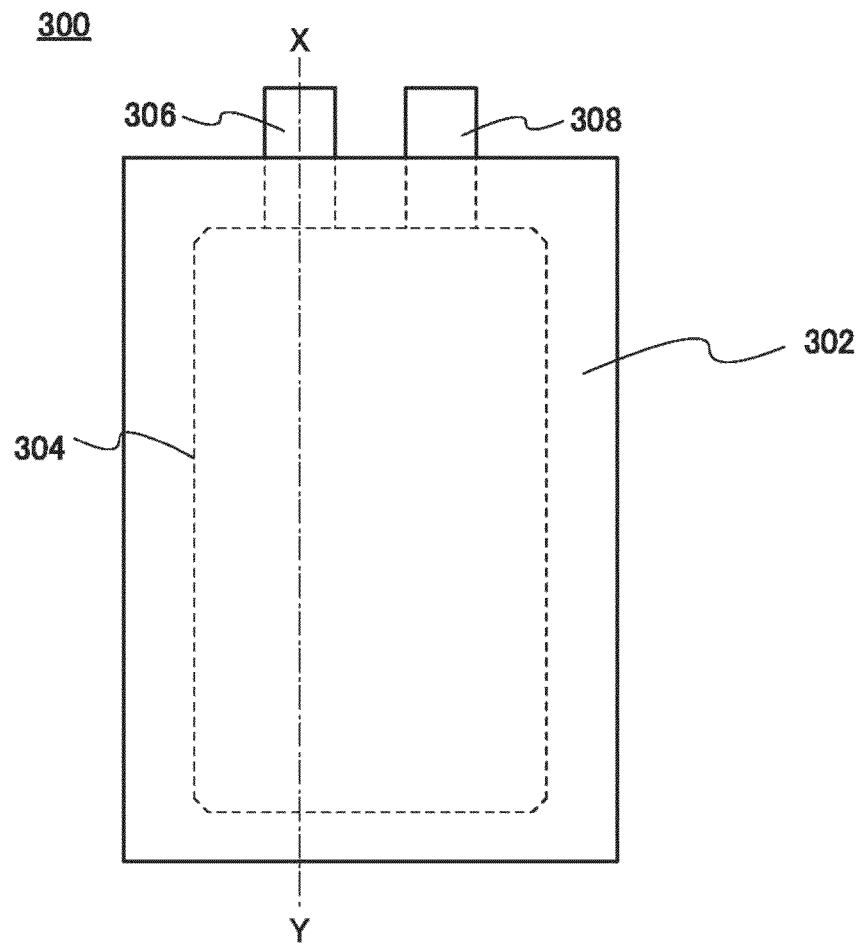
FIGS. 3A and 3B are a plan view and a cross-sectional view illustrating an embodiment of a power storage device.
Figure 3B:
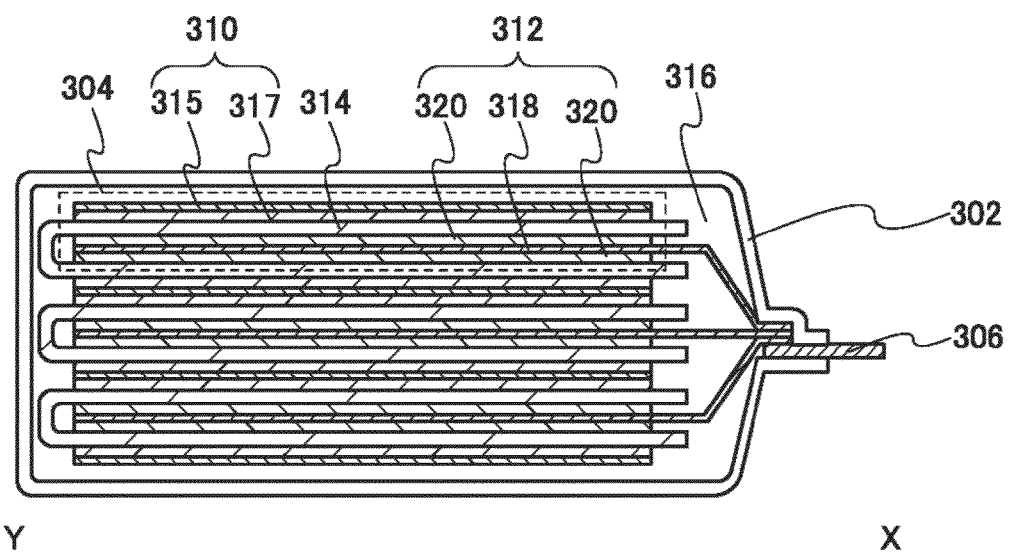

FIG. 3A illustrates a structural example of a power storage device 300. FIG. 3B is a cross-sectional view along dashed and dotted line X-Y in FIG. 3A.

In the power storage device 300 illustrated in FIG. 3A, a power storage cell 304 is included in an exterior member 302. The power storage device 300 further includes terminal portions 306 and 308 which are connected to the power storage cell 304. For the exterior member 302, a laminate film, a polymer film, a metal film, a metal case, a plastic case, or the like can be used.

As illustrated in FIG. 3B, the power storage cell 304 includes a negative electrode 310, a positive electrode 312, a separator 314 between the negative electrode 310 and the positive electrode 312, and an electrolyte 316 with which a portion surrounded by the exterior member 302 is filled.

The negative electrode 310 includes a negative electrode current collector 315 and a negative electrode active material layer 317. The negative electrode active material layer 317 is formed on one or opposite surfaces of the negative electrode current collector 315. Further, the negative electrode current collector 315 is connected to the terminal portion 308, and the terminal portion 308 partly extends outside the exterior member 302.

The positive electrode 312 includes a positive electrode current collector 318 and a positive electrode active material layer 320. The positive electrode active material layer 320 is formed on one or opposite surfaces of the positive electrode current collector 318. Further, the positive electrode 312 may include a binder and a conductive additive besides the positive electrode current collector 318 and the positive electrode active material layer 320. The positive electrode current collector 318 is connected to the terminal portion 306. Further, the terminal portions 306 and 308 each partly extend outside the exterior member 302.

Although a sealed thin power storage device is described as the power storage device 300 in this embodiment, the external shape of the power storage device 300 is not limited thereto. A power storage device having any of a variety of shapes, such as a button power storage device, a cylindrical power storage device, or a rectangular power storage device, can be used as the power storage device 300. Further, although the structure where the positive electrode, the negative electrode, and the separator are stacked is described in this embodiment, a structure where the positive electrode, the negative electrode, and the separator are rolled may be employed.

For the positive electrode current collector 318, a conductive material such as aluminum or stainless steel which is processed into a foil shape, a plate shape, a net shape, or the like can be used. Furthermore, a conductive layer provided by deposition separately on a substrate and then separated from the substrate can also be used as the positive electrode current collector 318.

The positive electrode active material layer 320 can be formed using $LiFeO_2$, $LiCoO_2$, $LiNiO_2$, $LiMn_2O_4$, $LiFePO_4$, $LiCoPO_4$, $LiNiPO_4$, $LiMnPO_4$, $V_2O_5$, $Cr_2O_5$, $MnO_2$, or other lithium compounds as a material. Note that when carrier ions are alkali metal ions other than lithium ions, alkaline earth metal ions, beryllium ions, or magnesium ions, the positive electrode active material layer 320 may be formed using, instead of lithium in the above lithium compounds, an alkali metal (e.g., sodium or potassium), an alkaline earth metal (e.g., calcium, strontium, or barium), beryllium, or magnesium.

The positive electrode active material layer 320 is formed over the positive electrode current collector 318 by a coating method or a physical vapor deposition method (e.g., a sputtering method), whereby the positive electrode 312 can be formed. In the case where a coating method is employed, the positive electrode active material layer 320 is formed in such a manner that a paste in which a conductive additive (e.g., acetylene black (AB)), a binder (e.g., polyvinylidene fluoride (PVDF)), and the like is mixed with any of the above materials for the positive electrode active material layer 320 is applied on the positive electrode current collector 318 and dried. In this case, the positive electrode active material layer 320 is preferably molded by applying pressure as needed.

Note that as the conductive additive, any electron-conductive material can be used as long as it does not cause a chemical change in the power storage device. For example, a carbon-based material such as graphite or carbon fibers; a metal material such as copper, nickel, aluminum, or silver; or a powder or fiber of a mixture thereof can be used.

As the binder, polysaccharides such as starch, carboxymethyl cellulose, hydroxypropyl cellulose, regenerated cellulose, and diacetyl cellulose; vinyl polymers such as polyvinyl chloride, polyvinyl pyrrolidone, polytetrafluoroethylene, polyvinylidene fluoride, polyethylene, polypropylene, polyvinyl alcohol, ethylene-propylene-diene monomer (EPDM) rubber, sulfonated EPDM rubber, styrene-butadiene rubber, butadiene rubber, and fluorine rubber; polyether such as polyethylene oxide; and the like can be given.

Alternatively, for the positive electrode active material layer 320, a paste in which, instead of a conductive additive and a binder, graphene or multilayer graphene is mixed with any of the above materials for the positive electrode active material layer 320 may be used. Note that an alkali metal such as potassium may be added to the graphene or multilayer graphene. Further, the graphene and the multilayer graphene can be obtained by producing graphene oxide through a Hummers method and performing reduction treatment.

The use of graphene or multilayer graphene instead of a conductive additive and a binder leads to a reduction in the amount of the conductive additive and the binder in the positive electrode 312. In other words, the weight of the positive electrode 312 can be reduced; accordingly, the charge/discharge capacity of the lithium-ion secondary battery per unit weight of the electrode can be increased.

Note that strictly speaking, "active material" refers only to a material that relates to insertion and elimination of ions functioning as carriers. In this specification, however, in the case of using a coating method to form the positive electrode active material layer 320, for the sake of convenience, the positive electrode active material layer 320 collectively refers to the material of the positive electrode active material layer 320, that is, a material that is actually a "positive electrode active material," a conductive additive, a binder, etc.

The active material layer 101 described in Embodiment 1 can be used for the negative electrode 310. That is, in the negative electrode 310, the negative electrode current collector 315 corresponds to the current collector 100 described in Embodiment 1, and the negative electrode active material layer 317 corresponds to the active material layer 101 described in Embodiment 1. Note that in the electrode illustrated in FIGS. 1A to 1C, the active material layer 101 is formed on only one surface of the current collector 100; however, the structure is not limited thereto, and the active material layer 101 may be formed on both surfaces of the current collector 100. For example, when the active material layer is formed using silicon while the negative electrode current collector 315 is held by a frame-like susceptor in an LPCVD apparatus, the active material layer can be formed on both the surfaces of the negative electrode current collector 315 at the same time. Accordingly, the number of manufacturing steps can be reduced in the case where both the surfaces of the negative electrode current collector 315 are used for formation of the electrode.

Note that the negative electrode active material layer 317 may be predoped with lithium. Predoping with lithium may be performed in such a manner that a lithium layer is formed on a surface of the negative electrode active material layer 317 by a sputtering method. Alternatively, a lithium foil may be provided on the surface of the negative electrode active material layer 317, whereby the negative electrode active material layer 317 can be predoped with lithium.

The electrolyte 316 is a nonaqueous solution containing a salt or a solution containing a salt as described above. In particular, in a lithium-ion secondary battery, a lithium-containing salt including lithium ions, carrier ions, is used. Typical examples of the salt include lithium salts such as $LiClO_4$, $LiAsF_6$, $LiBF_4$, $LiPF_6$, and $Li(C_2F_5SO_2)_2N$. Note that when carrier ions are alkali metal ions other than lithium ions or alkaline earth metal ions, alkali metal salt (e.g., sodium salt or potassium salt), alkaline earth metal salt (e.g., calcium salt, strontium salt or barium salt), beryllium salt, magnesium salt, or the like can be used as a solute of the electrolyte 316.

The electrolyte 316 is preferably a nonaqueous solution containing a salt. That is, as a solvent of the electrolyte 316, an aprotic organic solvent is preferably used. Examples of the aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. Alternatively, as the aprotic organic solvent, one ionic liquid or a plurality of ionic liquids may be used. Owing to non-flammability and non-volatility of an ionic liquid, it is possible to suppress explosion, inflammation, and the like of the power storage device 300 at the time when the internal temperature of the power storage device 300 rises, resulting in improvement in safety.

When a gelled high-molecular material containing a salt is used as the electrolyte 316, safety against liquid leakage is improved and the power storage device 300 can be thinner and more lightweight. Examples of the gelled high-molecular material include a silicon gel, an acrylic gel, an acrylonitrile gel, polyethylene oxide, polypropylene oxide, and a fluorine-based polymer.

Further, as the electrolyte 316, a solid electrolyte such as $Li_3PO_4$ can be used.

As the separator 314, an insulating porous material is used. For example, paper; nonwoven fabric; a glass fiber; ceramics; a synthetic fiber such as nylon (polyamide), vinylon (polyvinyl alcohol based fiber), polyester, acrylic, polyolefin, or polyurethane; or the like may be used. Note that a material which does not dissolve in the electrolyte 316 should be selected.

A lithium-ion secondary battery has a small memory effect, a high energy density, and a high charge/discharge capacity. In addition, the output voltage of the lithium-ion secondary battery is high. Thus, it is possible to reduce the size and weight of the lithium-ion secondary battery. Further, the lithium-ion secondary battery does not easily degrade due to repetitive charge/discharge and can be used for a long time, so that cost can be reduced.

In the case where the power storage device according to an embodiment of the present invention is a lithium-ion capacitor, instead of the positive electrode active material layer 320, a material capable of reversibly inserting and eliminating one of or both lithium ions and anions may be used. Examples of the material include active carbon, graphite, a conductive high molecule, and a polyacene organic semiconductor (PAS).

The power storage device according to an embodiment of the present invention has high adhesion between the current collector and the active material layer that are used for the negative electrode and high mechanical strength, so that the electrode can be bent, and the power storage device can be flexible.

Note that this embodiment can be implemented in appropriate combination with any of the structures of the other embodiments and example.

Embodiment 3

The power storage device according to an embodiment of the present invention can be used as a power supply of various electric devices which are driven by electric power.

Specific examples of the electric device utilizing the power storage device according to an embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, cameras such as video cameras and digital still cameras, high-frequency heating devices such as microwave ovens, electric rice cookers, electric washing machines, air-conditioning systems such as air conditioners, electric refrigerators, electric freezers, electric refrigerator-freezers, freezers for preserving DNA, and medical electrical equipment such as dialyzers. In addition, moving objects driven by an electric motor using power from a power storage device are also included in the category of electric devices. As examples of the moving objects, electric vehicles, hybrid vehicles which include both an internal-combustion engine and an electric motor, motorized bicycles including motor-assisted bicycles, and the like can be given.

In the electric devices, the power storage device according to an embodiment of the present invention can be used as a power storage device for supplying power for almost the whole power consumption (such a power storage device is referred to as a main power supply). Alternatively, in the electric devices, the power storage device according to an embodiment of the present invention can be used as a power storage device which can supply power to the electric devices when the supply of power from the main power supply or a commercial power supply is stopped (such a power storage device is referred to as an uninterruptible power supply). Further alternatively, in the electric devices, the power storage device according to an embodiment of the present invention can be used as a power storage device for supplying power to the electric devices at the same time as the power supply from the main power supply or a commercial power supply (such a power storage device is referred to as an auxiliary power supply).

Figure 4:
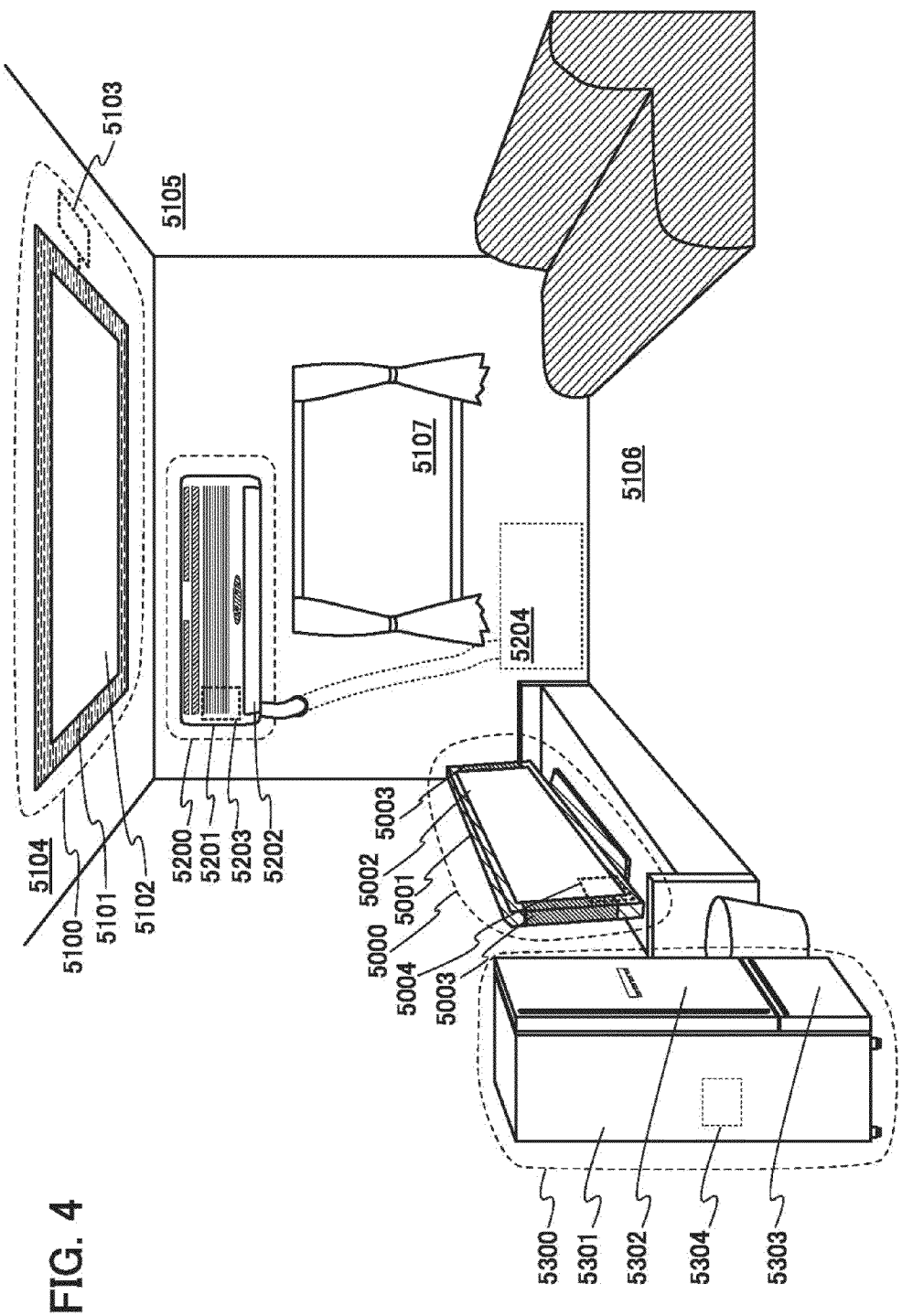
FIG. 4 is a diagram illustrating application examples of a power storage device.

FIG. 4 illustrates specific structures of the electric devices. In FIG. 4, a display device 5000 is an example of an electric device including a power storage device 5004 according to an embodiment of the present invention. Specifically, the display device 5000 corresponds to a display device for TV broadcast reception and includes a housing 5001, a display portion 5002, speaker portions 5003, the power storage device 5004, and the like. The power storage device 5004 according to an embodiment of the present invention is provided inside the housing 5001. The display device 5000 can receive power from a commercial power supply. Alternatively, the display device 5000 can use power stored in the power storage device 5004. Thus, the display device 5000 can be operated with the use of the power storage device 5004 according to an embodiment of the present invention as an uninterruptible power supply even when power cannot be supplied from the commercial power supply because of power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), a field emission display (FED), or the like can be used for the display portion 5002.

Note that the display device includes, in its category, all of information display devices for personal computers, advertisement displays, and the like in addition to TV broadcast reception.

In FIG. 4, an installation lighting device 5100 is an example of an electric device including a power storage device 5103 according to an embodiment of the present invention. Specifically, the lighting device 5100 includes a housing 5101, a light source 5102, the power storage device 5103, and the like. FIG. 4 shows the case where the power storage device 5103 is provided in a ceiling 5104 on which the housing 5101 and the light source 5102 are installed; alternatively, the power storage device 5103 may be provided in the housing 5101. The lighting device 5100 can receive power from a commercial power supply. Alternatively, the lighting device 5100 can use power stored in the power storage device 5103. Thus, the lighting device 5100 can be operated with the use of the power storage device 5103 according to an embodiment of the invention as an uninterruptible power supply even when power cannot be supplied from the commercial power supply because of power failure or the like.

Note that although the installation lighting device 5100 provided on the ceiling 5104 is illustrated in FIG. 4 as an example, the power storage device according to an embodiment of the present invention can be used in an installation lighting device provided on, for example, a wall 5105, a floor 5106, a window 5107, or the like other than the ceiling 5104. Alternatively, the power storage device can be used for a tabletop lighting device and the like.

As the light source 5102, an artificial light source which emits light artificially by using power can be used. Specifically, a discharge lamp such as an incandescent lamp or a fluorescent lamp, and a light-emitting element such as an LED or an organic EL element are given as examples of the artificial light source.

In FIG. 4, an air conditioner including an indoor unit 5200 and an outdoor unit 5204 is an example of an electric device including a power storage device 5203 according to an embodiment of the present invention. Specifically, the indoor unit 5200 includes a housing 5201, a ventilation duct 5202, the power storage device 5203, and the like. FIG. 4 shows the case where the power storage device 5203 is provided in the indoor unit 5200; alternatively, the power storage device 5203 may be provided in the outdoor unit 5204. Alternatively, the power storage device 5203 may be provided in each of the indoor unit 5200 and the outdoor unit 5204. The air conditioner can receive power from a commercial power supply. Alternatively, the air conditioner can use power stored in the power storage device 5203. Specifically, in the case where the power storage device 5203 is provided in each of the indoor unit 5200 and the outdoor unit 5204, the air conditioner can be operated with the use of the power storage device 5203 according to an embodiment of the present invention as an uninterruptible power supply even when power cannot be supplied from the commercial power supply because of power failure or the like.

Note that although the separated air conditioner including the indoor unit and the outdoor unit is illustrated in FIG. 4 as an example, the power storage device according to an embodiment of the present invention can be used in an air conditioner in which functions of an indoor unit and an outdoor unit are integrated in one housing.

In FIG. 4, an electric refrigerator-freezer 5300 is an example of an electric device including a power storage device 5304 according to an embodiment of the present invention. Specifically, the electric refrigerator-freezer 5300 includes a housing 5301, a refrigerator door 5302, a freezer door 5303, the power storage device 5304, and the like. The power storage device 5304 is provided in the housing 5301 in FIG. 4. The electric refrigerator-freezer 5300 can receive power from a commercial power supply. Alternatively, the electric refrigerator-freezer 5300 can use power stored in the power storage device 5304. Thus, the electric refrigerator-freezer 5300 can be operated with the use of the power storage device 5304 according to an embodiment of the present invention as an uninterruptible power supply even when power cannot be supplied from the commercial power supply because of power failure or the like.

Note that among the electric devices described above, a high-frequency heating apparatus such as a microwave oven and an electric device such as an electric rice cooker require high power in a short time. The tripping of a circuit breaker of a commercial power supply in use of electric devices can be prevented by using the power storage device according to an embodiment of the present invention as an auxiliary power supply for supplying power which cannot be supplied enough by a commercial power supply.

In addition, in a time period when electric devices are not used, specifically when a rate of actual use of power with respect to the total amount of power which can be supplied by a commercial power supply (such a rate is referred to as a usage rate of power) is low, power is stored in the power storage device, whereby the usage rate of power can be reduced in a time period when the electric devices are used. For example, in the case of the electric refrigerator-freezer 5300, power is stored in the power storage device 5304 at night time when the temperature is low and the refrigerator door 5302 and the freezer door 5303 are not opened or closed. The power storage device 5304 is used as an auxiliary power supply in daytime when the temperature is high and the refrigerator door 5302 and the freezer door 5303 are opened and closed; thus, the usage rate of power in daytime can be reduced.

Note that this embodiment can be implemented in appropriate combination with any of the structures of the other embodiments and example.

Example 1

Step of Manufacturing Electrode

In this example, an example of manufacturing an active material layer including bases and whiskers according to an embodiment of the present invention will be described.

An active material layer was formed over a current collector. As a material of the current collector, titanium was used. As the current collector, a sheet of a titanium film (also referred to as a titanium sheet) with a thickness of 100 μm was used.

Over the titanium film serving as a current collector, a silicon layer serving as an active material layer was formed by an LPCVD method. The silicon layer was formed by an LPCVD method under the following conditions: silane and nitrogen were introduced into a reaction chamber with a flow rate of 300 sccm; the pressure of the reaction chamber was 150 Pa; and the temperature of the reaction chamber was 550° C. The reaction chamber was made of quartz. When the temperature of the current collector was increased, a small amount of Ar was introduced.

<Observation of Base in Active Material Layer>

Figure 5A:
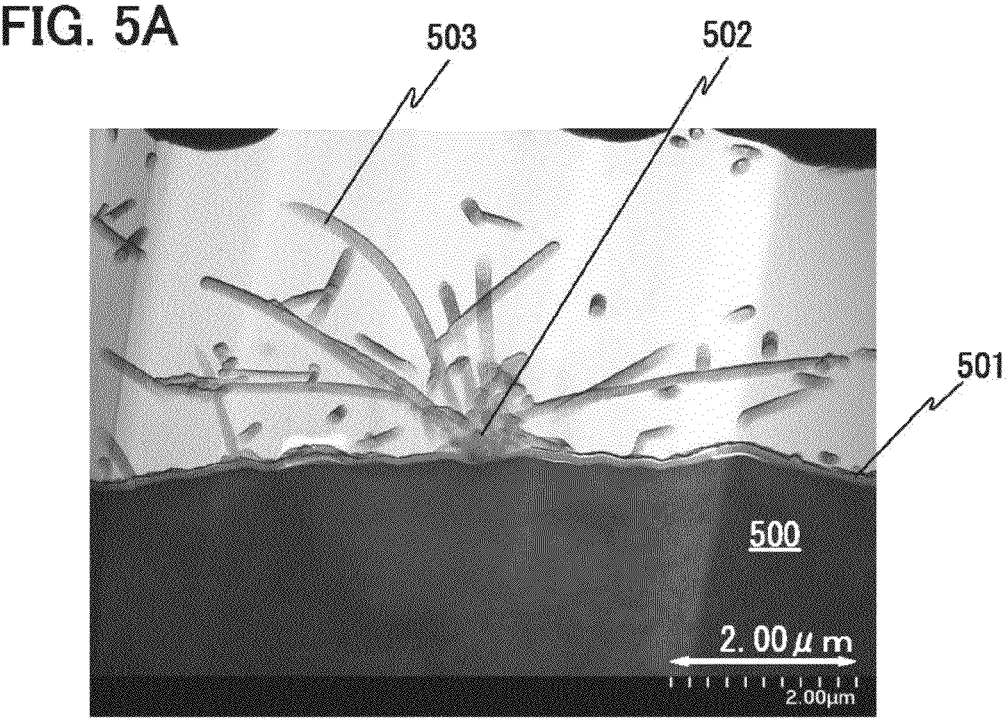
FIGS. 5A and 5B are each a TEM image showing the structure of an active material layer.
Figure 5B:
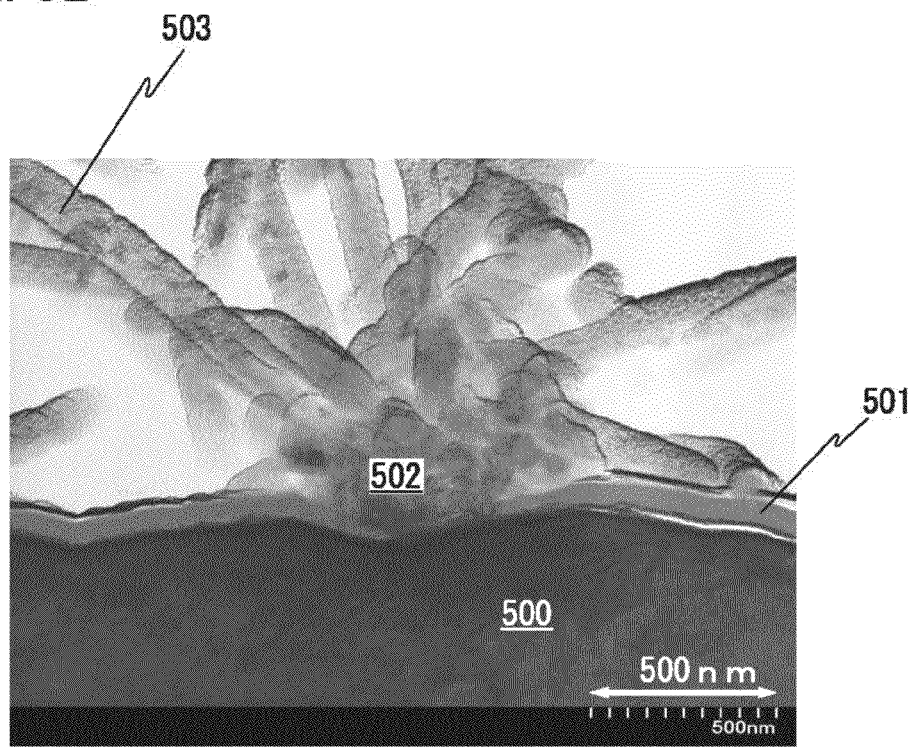

FIGS. 5A and 5B are images which are taken by a transmission electron microscope (TEM) and show a cross section of a base which was generated through formation of the active material layer under the above deposition conditions. The deposition time at this time was 10 minutes. FIG. 5A is an image showing a group of whiskers generated from one base. FIG. 5B is an image obtained by enlarging a region of the base in the image of FIG. 5A. Note that the TEM images in FIGS. 5A and 5B show the sample that was coated with platinum, carbon, and tungsten for observation.

In FIGS. 5A and 5B, a thin film portion 501 of the active material layer which was deposited over a titanium sheet 500 by an LPCVD method is observed. At the center of the image, a base 502 formed over the titanium sheet and a whisker 503 extending from the base 502 can be observed.

The surface of the titanium sheet 500 has a shape with a projection and a depression with a height or a depth of about 200 nm to 400 nm. Over the surface of the titanium sheet 500, in accordance with the projection and the depression, the thin film portion 501 with a thickness of about 50 nm is formed. FIG. 5B shows the base 502 formed at the depression of the titanium sheet 500. According to the results of electron diffraction, it was confirmed that silicon included in the thin film portion 501 is amorphous and that silicon included in the base 502 is crystalline. As shown in FIG. 5B, the base is observed as a group of a plurality of whiskers. Among them, some whiskers grow away from the base as columnar whiskers to be long, whereas some other whiskers do not grow and exist only at the base. Note that the whiskers are not limited to those observed in FIG. 5B. There are also whiskers which extend in directions which cross the directions in which the whiskers in FIG. 5B grow.

Figure 6A:
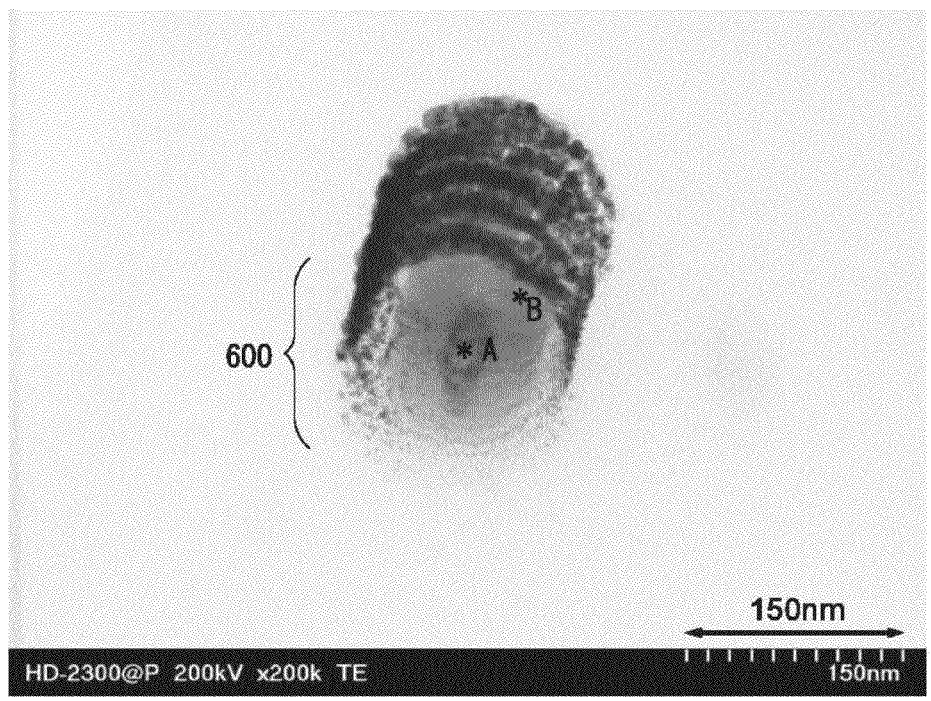
FIGS. 6A to 6C are each a TEM image showing the structure of a whisker.
Figure 6B:
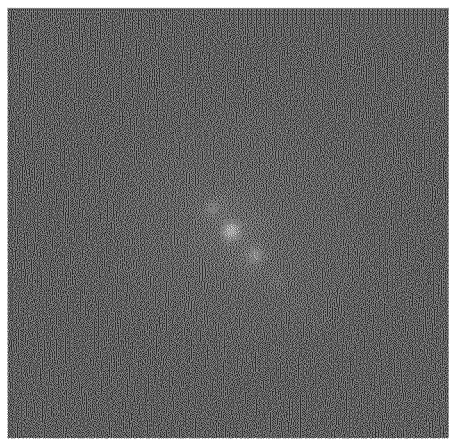
Figure 6C:
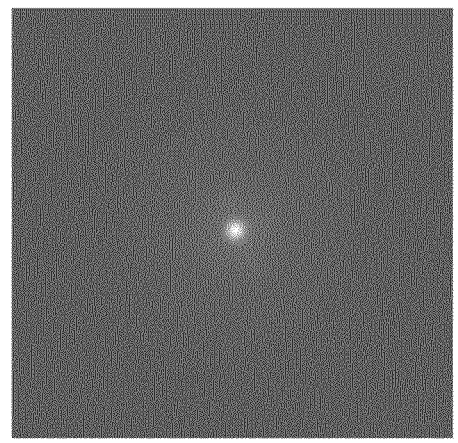

FIG. 6A is a TEM image in which a transverse cross section of the whisker is magnified for observation. It is found that a cross section 600 of the whisker is circular. FIG. 6B shows a result of performing electron diffraction on a point A in the cross section 600 of FIG. 6A, that is, the center of the whisker. FIG. 6C shows a result of performing electron diffraction on a point B in the cross section 600 of FIG. 6A, that is, the edge of the whisker. There is a diffraction spot in the electron diffraction image in FIG. 6B, which shows that the point A, that is, a portion corresponding to the core of the whisker is crystalline silicon. On the other hand, there is no diffraction spot but a halo ring in the electron diffraction image in FIG. 6C, which shows that the outer shell that covers the core of the whisker is amorphous silicon.

<Evaluation of Diameter of Whisker>

Figure 7A:
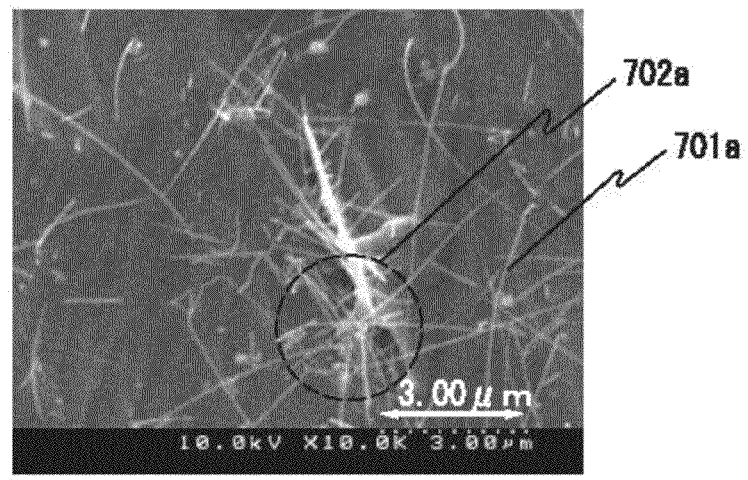
FIGS. 7A to 7C are each a SEM image showing the growth of a whisker.
Figure 7B:
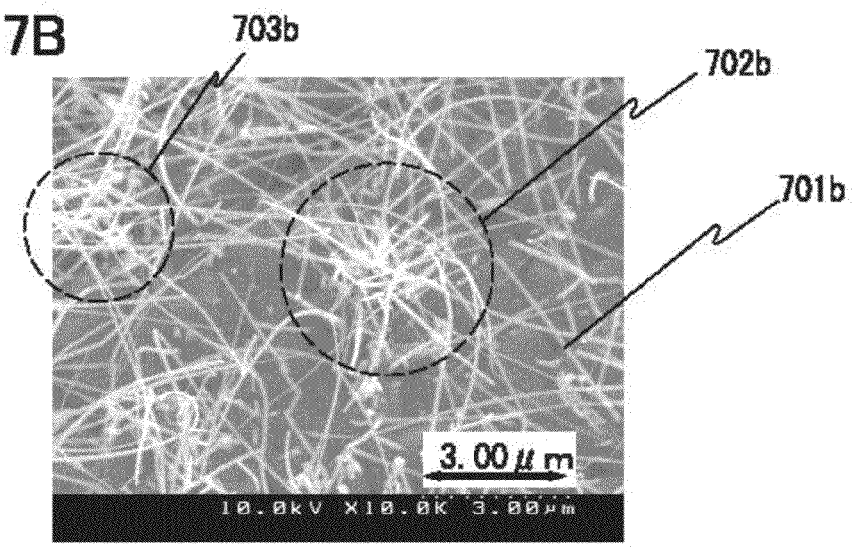
Figure 7C:
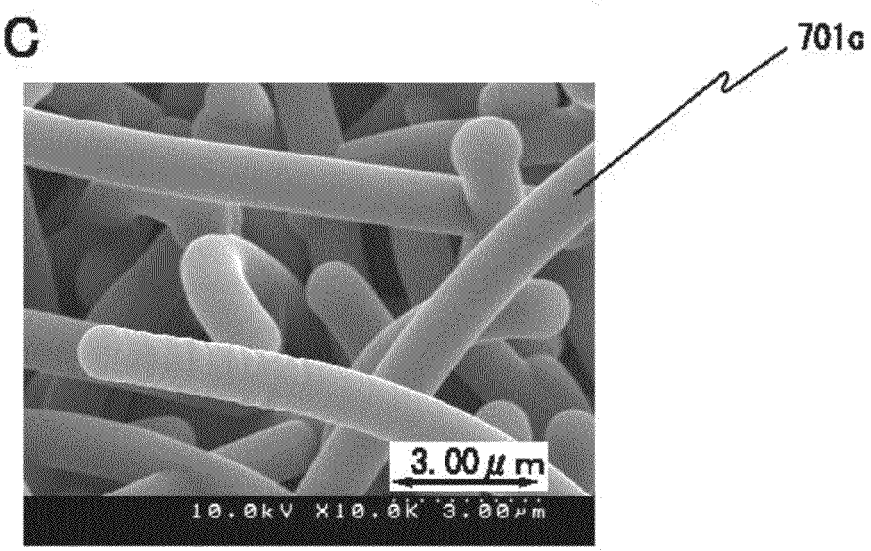

FIGS. 7A to 7C show how the whiskers grow depending on the deposition time of the active material layer. The deposition condition of the active material layer, except for the deposition time, is the same as the sample which was observed with a TEM. Each image was taken by a scanning electron microscope (SEM) with a surface of the sample over which the active material layer was formed inclined at 30° with respect to the horizontal plane at the same magnification.

FIG. 7A is an image which was taken after performing deposition of the active material layer for 6 minutes and stopping the deposition. There are whiskers 701a scattered in places. The number of the whiskers is not large. The diameter of the whisker observed (whisker diameter) was about 75 nm. In addition, there is a base 702a formed in a region surrounded by a dashed line in FIG. 7A.

FIG. 7B is an image of a surface of a sample which was taken with a SEM after performing deposition of the active material layer for 10 minutes. The sample in FIG. 7B is different from that in FIG. 7A. As compared to the active material layer in FIG. 7A, the deposition time is longer so that the growth of a whisker 701b proceeds. The whisker diameter was about 100 nm. In addition, it is found that there is a base 702b in a region surrounded by a dashed line in FIG. 7B. As compared to the base in FIG. 7A, whiskers extending from the base are densely provided. There are also a plurality of whiskers which grow from the base 702b to another base 703b and from the base 703b to the base 702b.

FIG. 7C is an image of a surface of a sample which was taken with a SEM after performing deposition of the active material for 120 minutes. It is found that as compared to FIGS. 7A and 7B, the growth of a whisker 701c proceeds and the whisker diameter significantly increases. The whisker diameter was about 1000 nm. Further, when the deposition time was 240 minutes, the whisker diameter was about 2800 nm.

It is found that by lengthening the deposition time of the active material layer, the whisker grown from the base extends in any direction and the whisker diameter increases.

<Formation of Bridge Structure with Whiskers>

Figure 8A:
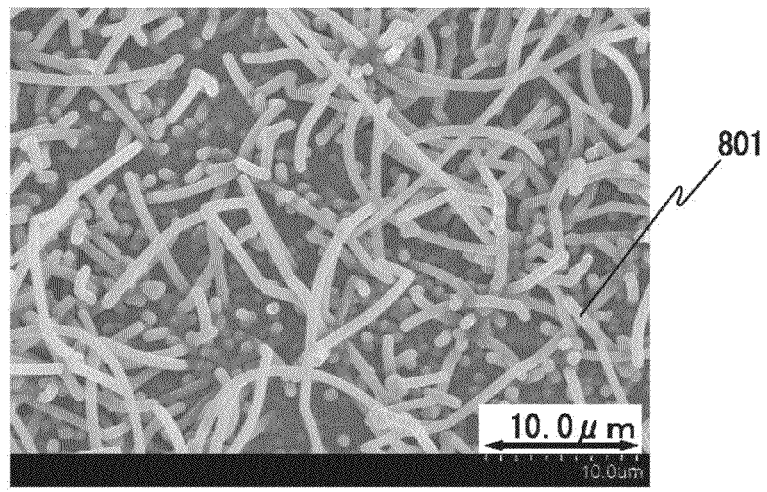
FIGS. 8A to 8C are each a SEM image showing a bridge structure of whiskers.
Figure 8B:
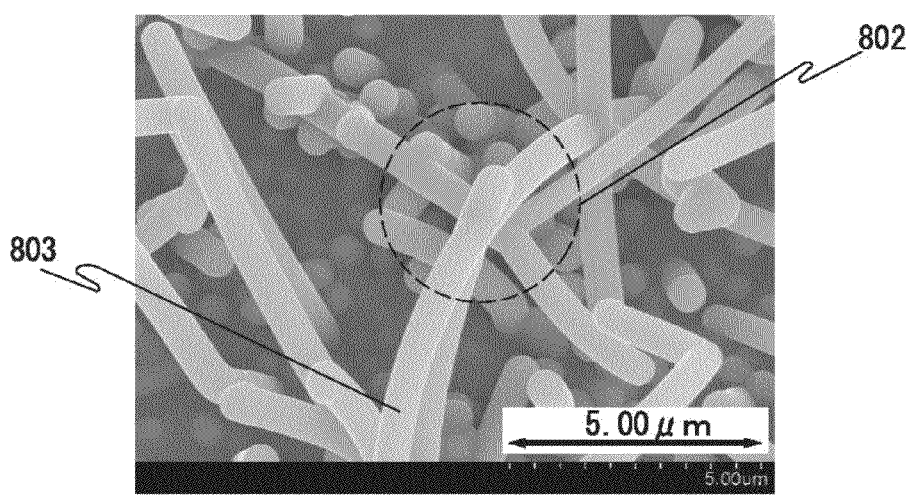
Figure 8C:
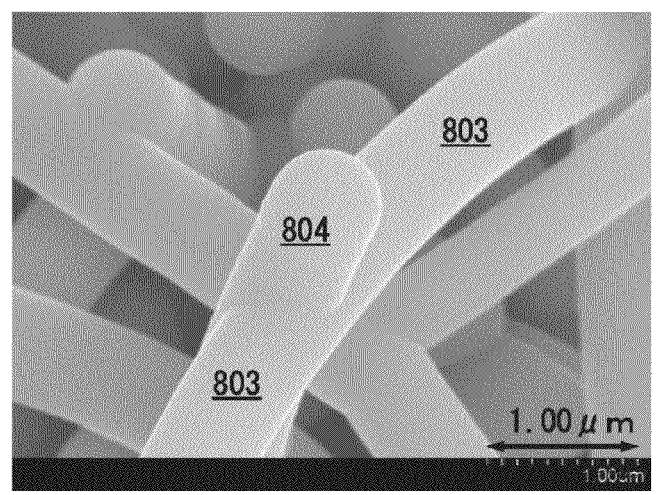

FIGS. 8A to 8C show a bridge structure formed when whiskers are combined with each other. FIGS. 8A to 8C are each a SEM image of a silicon active material layer formed by an LPCVD method under the following conditions which are the same as the above: the flow rate of each of silane and nitrogen was 300 sccm, the pressure in a reaction chamber was 150 Pa, and the temperature of the reaction chamber was 550° C. The deposition time was 60 minutes.

As shown in FIG. 8A, when the active material layer was formed, a number of whiskers 801 were formed over a titanium sheet. FIG. 8B is a SEM image obtained by enlarging part of FIG. 8A. In a region 802 surrounded by a dashed line at the center of the image, a bridge structure of the whiskers can be observed. In FIG. 8C, this region is further magnified. A whisker 803 shown in FIG. 8C grows from an upper right part toward a lower left part in the image. The whisker 803 is combined with a whisker 804 which extends from a lower part and is different from the whisker 803 to form a linking point and further extends to the lower left part in the image. In such a manner, a whisker can be combined with another whisker to form a bridge structure. The diameters of the whiskers 803 and 804 observed are 700 nm to 800 nm.

As shown in FIGS. 8A to 8C, the top of the whisker is rounded and has a semispherical shape. With this, when ions are occluded by the whisker, distortion due to expansion can be prevented from being concentrated on one point, whereby breaking of the whisker can be suppressed.

As described above, a bridge structure is formed by combination of two or more whiskers. In addition, the whisker preferably has a diameter large enough to maintain its strength. Accordingly, the mechanical strength of a whisker which is low by itself can be improved.

This application is based on Japanese Patent Application serial no. 2011-186811 filed with Japan Patent Office on Aug. 30, 2011, the entire contents of which are hereby incorporated by reference.

What is claimed is:

1. A power storage device comprising:
a current collector; and
a silicon layer having a function as an active material layer over the current collector,
wherein the silicon layer comprises:
   a thin silicon film portion in contact with the current collector,
   a first base comprising crystalline silicon formed in the thin silicon film portion and having a stump-like shape;
   a second base comprising crystalline silicon formed in the thin silicon film portion and having a stump-like shape;
   a first whisker-like protrusion extending from the first base, the first whisker-like protrusion comprising a first core and a first shell;
   a second whisker-like protrusion extending from the first base, the second whisker-like protrusion comprising a second core and a second shell;
   a third whisker-like protrusion extending from the second base, the third whisker-like protrusion comprising third core and third shell; and
   a fourth whisker-like protrusion extending from the second base, the fourth whisker-like protrusion comprising a fourth core and a fourth shell,
wherein each of the first core and the third core comprises crystalline silicon,
wherein each of the first shell and the third shell comprises amorphous silicon, and
wherein the first shell is directly combined with the third shell.

2. The power storage device according to claim 1, wherein the first whisker-like protrusion is combined with the second whisker-like protrusion.

3. The power storage device according to claim 1, wherein the first whisker-like protrusion has a columnar shape such as a cylindrical shape or a prismatic shape, or a needle-like shape such as a conical shape or a pyramidal shape.

4. The power storage device according to claim 1, wherein the thin silicon film portion comprises amorphous silicon.

5. An electrode comprising:
a current collector; and
a silicon layer having a function as an active material layer over the current collector,
wherein the silicon layer comprises:
   a thin silicon film portion in contact with the current collector,
   a first base comprising crystalline silicon formed in the thin silicon film portion and having a stump-like shape;
   a second base comprising crystalline silicon formed in the thin silicon film portion and having a stump-like shape;
   a first whisker-like protrusion extending from the first base, the first whisker-like protrusion comprising a first core and a first shell;
   a second whisker-like protrusion extending from the first base, the second whisker-like protrusion comprising a second core and a second shell;
   a third whisker-like protrusion extending from the second base, the third whisker-like protrusion comprising a third core and a third shell; and a fourth whisker-like protrusion extending from the second base, the fourth whisker-like protrusion comprising a fourth core and a fourth shell, wherein each of the first core and the third core comprises crystalline silicon, wherein each of the first shell and the third shell comprises amorphous silicon, and wherein the first shell is directly combined with the third shell.

6. The electrode according to claim 5,
wherein the electrode is a negative electrode.

7. The electrode according to claim 5,
wherein the first whisker-like protrusion is combined with the second whisker-like protrusion.

8. The electrode according to claim 5,
wherein the first whisker-like protrusion has a columnar shape such as a cylindrical shape or a prismatic shape, or a needle-like shape such as a conical shape or a pyramidal shape.

9. The electrode according to claim 5,
wherein the thin silicon film portion comprises amorphous silicon.

10. A silicon layer comprising:
a thin silicon film portion;
a first base comprising crystalline silicon formed in the thin silicon film portion and having a stump-like shape;
a second base comprising crystalline silicon formed in the thin silicon film portion and having a stump-like shape;
a first whisker-like protrusion extending from the first base, the first whisker-like protrusion comprising a first core and a first shell;
a second whisker-like protrusion extending from the first base, the second whisker-like protrusion comprising a second core and a second shell; and
a third whisker-like protrusion extending from the second base, the third whisker-like protrusion comprising a third core and a third shell, wherein each of the first core and the third core comprises crystalline silicon, wherein each of the first shell and the third shell comprises amorphous silicon, and wherein the first shell is directly combined with the third shell.

11. The silicon layer according to claim 10,
wherein the first whisker-like protrusion is combined with the second whisker-like protrusion.

12. The silicon layer according to claim 10,
wherein the first whisker-like protrusion has a columnar shape such as a cylindrical shape or a prismatic shape, or a needle-like shape such as a conical shape or a pyramidal shape.

13. The silicon layer according to claim 10,
wherein the thin silicon film portion comprises amorphous silicon.

14. The power storage device according to claim 1,
wherein the current collector comprises a metal element which forms silicide by reacting with silicon.

15. The electrode according to claim 5,
wherein the current collector comprises a metal element which forms silicide by reacting with silicon.

16. The power storage device according to claim 1,
wherein a width of the first core is greater than or equal to 0.5 μm and less than or equal to 2 μm, and
wherein a length of the first core is greater than or equal to 0.5 μM and less than or equal to 1000 μm.

17. The electrode according to claim 5,
wherein a width of the first core is greater than or equal to 0.5 μm and less than or equal to 2 μm, and
wherein a length of the first core is greater than or equal to 0.5 μM and less than or equal to 1000 μm.

18. The silicon layer according to claim 10,
wherein a width of the first core is greater than or equal to 0.5 μm and less than or equal to 2 μm, and
wherein a length of the first core is greater than or equal to 0.5 μM and less than or equal to 1000 μm.

* * * * *